(12) United States Patent
Dailey

(10) Patent No.: US 7,020,877 B2
(45) Date of Patent: Mar. 28, 2006

(54) METHOD TO DISTRIBUTE PERIODIC TASK WORKLOAD

(75) Inventor: James E. Dailey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 694 days.

(21) Appl. No.: 10/151,355

(22) Filed: May 20, 2002

(65) Prior Publication Data

US 2003/0217093 A1 Nov. 20, 2003

(51) Int. Cl.
*G06F 9/46* (2006.01)

(52) U.S. Cl. ...................... 718/102; 718/100
(58) Field of Classification Search ............ 718/100, 718/102, 103, 104
See application file for complete search history.

(56) References Cited

U.S. PATENT DOCUMENTS

| | | | | |
|---|---|---|---|---|
| 5,875,464 A | * | 2/1999 | Kirk | 711/129 |
| 5,918,049 A | | 6/1999 | Syväniemi | 395/674 |
| 6,012,080 A | * | 1/2000 | Ozden et al. | 718/102 |
| 6,110,220 A | * | 8/2000 | Dave et al. | 716/3 |
| 6,112,225 A | | 8/2000 | Kraft et al. | 709/202 |
| 6,115,823 A | | 9/2000 | Velasco et al. | 713/322 |
| 6,148,324 A | * | 11/2000 | Ransom et al. | 718/105 |
| 6,178,542 B1 | * | 1/2001 | Dave | 716/18 |
| 6,189,022 B1 | * | 2/2001 | Binns | 718/100 |
| 6,385,638 B1 | * | 5/2002 | Baker-Harvey | 718/107 |
| 6,415,384 B1 | * | 7/2002 | Dave | 713/100 |

OTHER PUBLICATIONS

"Scheduling of Hard Aperiodic Tasks in Hybrid Static/Dyamic Priority System", Jongwon Lee et al, Software Research Lab., Korea Seoul, Korea, Department of Computer Engineering, Kyunghee University, Seoul, Korea, ACM SIGPLAN, vol. 30, No. 11, Nov. 1995.*

"Scheduling Soft Aperiodic Tasks in Adaptable Fixed-Priority System", Jongwon Lee et al, Software Research Lab., Korea Seoul, Korea, Department of Computer Engineering, Kyunghee University, Seoul, Korea, ACM SIGPLAN, vol. 30, issue 4, Oct. 1996.*

* cited by examiner

Primary Examiner—Majid Banankhah
(74) Attorney, Agent, or Firm—Baker Botts L.L.P.

(57) ABSTRACT

A method to distribute periodic task workload in an information handling system includes distributing processing tasks using a tick interval. A first execution trigger in a service variable may be set at a first multiple of a predetermined tick interval. A second execution trigger may be set at a second multiple of the predetermined tick interval. The second multiple may be greater than and staggered from the first multiple, such that the first and second execution triggers may not both be set during the same tick interval. The service variable may be interrogated at the predetermined tick interval. A first processing task associated with the first execution trigger may be executed in response to detecting that the first execution trigger has been set. A second processing task associated with the second execution trigger may be executed in response to detecting that the second execution trigger has been set.

20 Claims, 3 Drawing Sheets

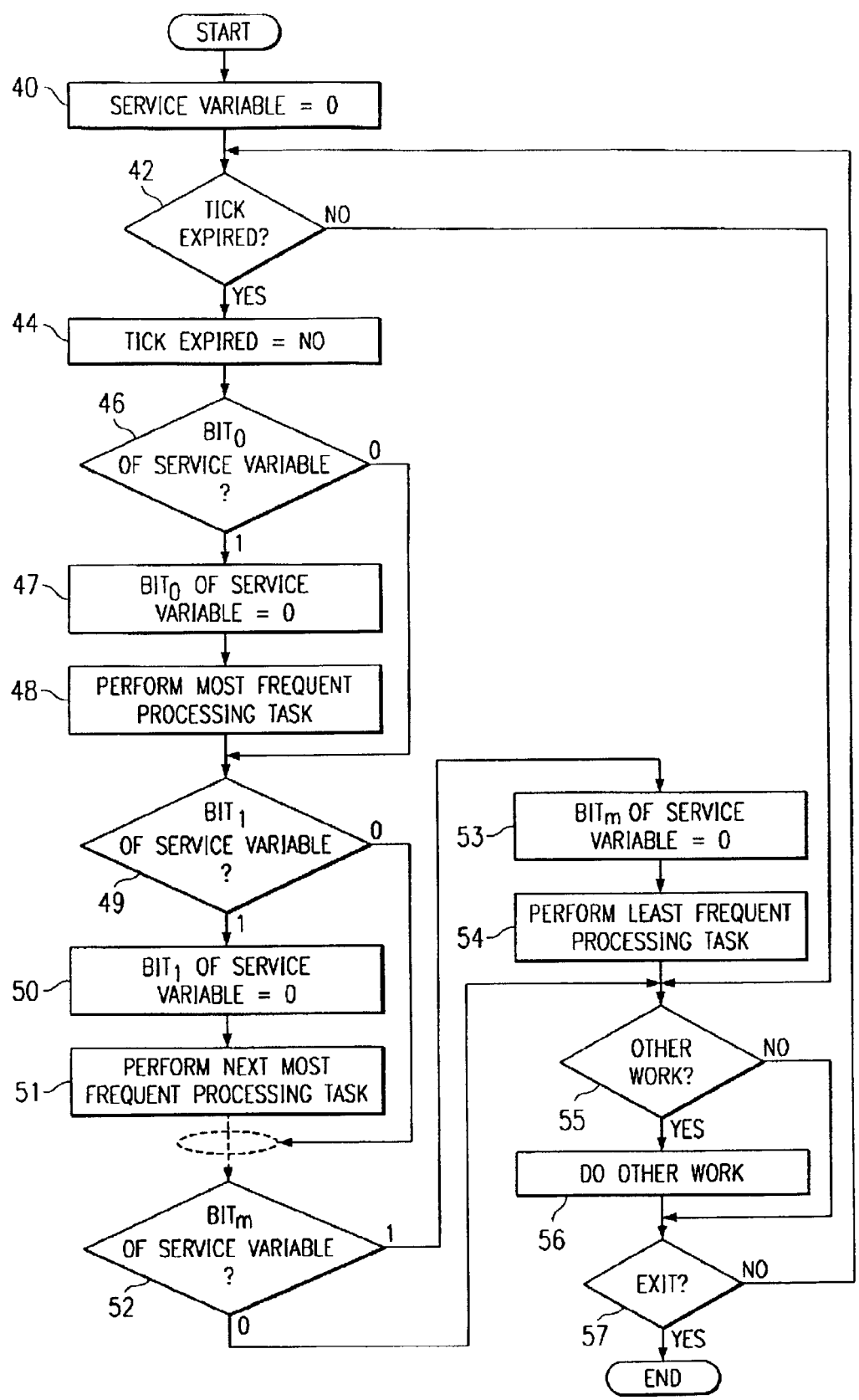

| TIME VARIABLE (58) | SERVICE VARIABLE (59) | MOST FREQUENT PROCESSING TASK (60) | SECOND MOST FREQUENT PROCESSING TASK (63) | THIRD MOST FREQUENT PROCESSING TASK (64) | FOURTH MOST FREQUENT PROCESSING TASK (66) | FIFTH MOST FREQUENT PROCESSING TASK (68) |
|---|---|---|---|---|---|---|
| 00000 | 00000 | | | | | |
| 00001 | 00001 | A | | | | |
| 00010 | 00010 | | B | | | |
| 00011 | 00001 | A | | | | |
| 00100 | 00100 | | | C | | |
| 00101 | 00001 | A | | | | |
| 00110 | 00010 | | B | | | |
| 00111 | 00001 | A | | | | |
| 01000 | 01000 | | | | D | |
| 01001 | 00001 | A | | | | |
| 01010 | 00010 | | B | | | |
| 01011 | 00001 | A | | | | |
| 01100 | 00100 | | | C | | |
| 01101 | 00001 | A | | | | |
| 01110 | 00010 | | B | | | |
| 01111 | 00001 | A | | | | |
| 10000 | 10000 | | | | | E |
| 10001 | 00001 | A | | | | |
| 10010 | 00010 | | B | | | |
| 10011 | 00001 | A | | | | |
| 10100 | 00100 | | | C | | |
| ⋮ | 62 ⋮ | ⋮ | ⋮ | ⋮ | ⋮ | ⋮ |

TICK INTERVAL 61

*FIG. 4*

METHOD TO DISTRIBUTE PERIODIC TASK WORKLOAD

TECHNICAL FIELD OF THE INVENTION

This disclosure relates in general to the field of computers, and more particularly to a method to distribute periodic task workloads.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hardware and software components of an information handling system may utilize computer applications such as computer programs to aid in performing their function. In running a computer program, a computer component may include an embedded microcontroller to perform several processing tasks at periodic intervals. Generally, some processing tasks are grouped to be performed at one periodic interval, while other tasks are performed at a different interval.

Often, a microcontroller may have to perform real-time processing tasks. Because the speed and power of a microprocessor is limited, a distributed workload is desirable for managing all these tasks. In certain instances, real-time processing tasks may have their processing time delayed because several non-real-time processing tasks are grouped to be performed during that particular periodic interval. Since these tasks may occur at one periodic interval, handling of tasks or groups of tasks can lead to spikes in the workload. For example, if a first group of processing tasks are to be processed every quarter second, and a second and third group are to be processed every half second and every second, respectively, then at every second interval, a microcontroller may process all of these tasks in a burst of activity.

SUMMARY OF THE INVENTION

The present disclosure relates to a method of distributing a periodic task workload. According to an example embodiment, an information handling system includes a method of distributing processing tasks using a tick interval. A task manager may include setting a first execution trigger in a service variable at a first multiple of a predetermined tick interval. At a second multiple of the predetermined tick interval, the task manager may set a second execution trigger in the service variable. The second multiple may be greater than the first multiple and the second multiple may be staggered from the first multiple, such that the first execution trigger and the second execution trigger are not both set during the same tick interval. Next, the task manager may interrogate the service variable at the predetermined tick interval. In response to detecting that the first execution trigger has been set, the task manager may execute a first processing task associated with the first execution trigger. In response to detecting that the second execution trigger has been set, the task manager may execute a second processing task associated with the second execution trigger.

In another embodiment, an information handling system includes a microcontroller that may be used to recognize a predetermined tick interval, to maintain a service variable, to associate computing tasks with execution triggers, and to execute the computing task. The system may further include a task manager associated with the microcontroller. The task manager may perform computer operations that include setting a first execution trigger in the service variable at a first multiple of the predetermined tick interval. At a second multiple of the predetermined tick interval, the task manager may set a second execution trigger in the service variable. The second multiple may be greater than the first multiple and the second multiple may be staggered from the first multiple, such that the first execution trigger and the second execution trigger are not both set during the same tick interval. The task manager may interrogate the service variable at the predetermined tick interval. In response to detecting that the first execution trigger has been set, the task manager may execute a first computing task associated with the first execution trigger. In response to detecting that the second execution trigger has been set, the task manager may execute a second computing task associated with the second execution trigger.

In an alternate embodiment, a method of distributing computer tasks using a tick interval in a computer system includes generating a tick interval for the computer system. The tick interval may occur at least twice as frequently as the most frequently occurring processing task among a predetermined set of processing tasks. The task manager may perform not more than one processing task from the predetermined set of processing tasks at the tick interval. The method may perform the most frequently occurring computer tasks at every other tick interval.

Technical advantages of certain embodiments of the present invention include the ability to use a single service variable to maintain a timer for multiple processing tasks, instead of using several computer variables. Memory requirements for the microcontroller may therefore be reduced. For example, the service variable may set individual bits as bit triggers for respective for processing tasks.

Another technical advantage of certain embodiments of the present invention include the ability of a microcontroller to perform other processing tasks at each tick interval. Because each processing task may be associated with a different tick interval, processing tasks may be completed during a predetermined tick interval to allow other processing work, such as real-time tasks to be completed during any time remaining within the tick. Additionally, some of the tick intervals may not have periodic processing tasks assigned to them, thus, other processing work may be performed during the entire tick interval.

All, some or none of these technical advantages may be present in various embodiments of the present invention.

Other technical advantages will be readily apparent to one skilled in the art from the following figures, descriptions, and claims.

BRIEF DESCRIPTION OF THE DRAWINGS

A more complete understanding of the embodiments of the present invention and advantages thereof may be acquired by referring to the following description taken in conjunction with the accompanying drawings, in which like reference numbers indicate like features, and wherein:

FIG. 3 illustrates a flowchart of an example embodiment of a process for using the service variable to manage processing tasks according to the teachings of the present invention;

FIG. 4 illustrates a chart showing associations between various processing tasks and various values of the service variable according to an example embodiment of the present invention.

DETAILED DESCRIPTION

Preferred embodiments of the present invention and their advantages are best understood by reference to FIGS. 1 through 5, where like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices, as well as various input and output (I/O) devices, such as a keyboard, a mouse, and a video display. The information handling system may also include one or more buses operable to transmit communications between the various hardware components.

Figure 1:
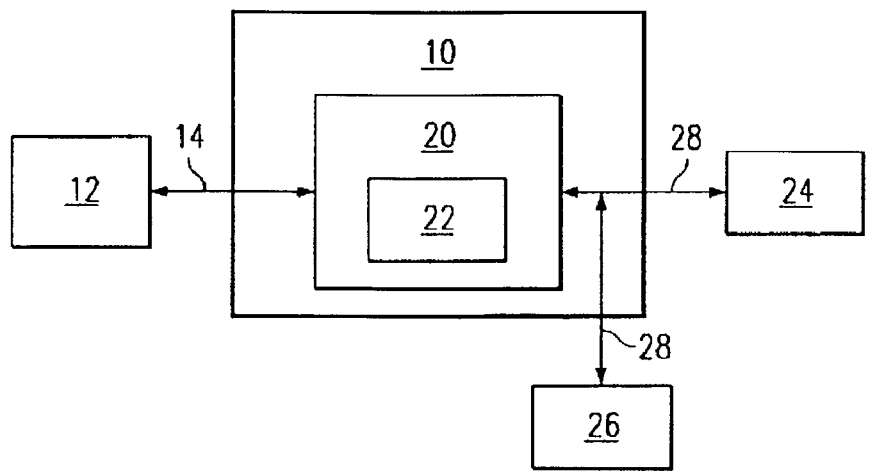
FIG. 1 illustrates a block diagram of an example embodiment of a microcontroller including a task manager for distributing periodic tasks workloads according to the teachings of the present invention.

FIG. 1 illustrates a block diagram of microcontroller 20 including task manager 22 for distributing a periodic task workload. In one embodiment, microcontroller 20 is an embedded controller in docking station 10. Docking station 10 may be in communication with host computer 12 via bus connection 14. Communications on bus connection 14 between host computer 12 and microcontroller 20 may include data for periodic tasks and real-time tasks executed by microcontroller 20. The periodic and real-time tasks may also return data to host computer 12 via bus connection 14.

Microcontroller 20 may include a processor such as a CPU for executing computer programs, memory such as RAM or ROM, and I/O facilities. Microcontroller 20 may perform a specific workload via assigned tasks. Typically, microcontroller 20 utilizes task manager 22 to manage specific tasks retained in memory. Generally, these tasks are performed at various times and the schedule for performing the tasks usually does not change. Specifically, task manager 22 may manage these tasks to be performed at given intervals.

Task manager 22, may distribute the periodic task workload for docking station 10. In the example embodiment, task manager 22 distributes the periodic tasks to allow for other processing work to be processed following the scheduled task's completion.

For example, battery 26 and battery charger 24 may be in communication with microcontroller 20 via battery charger bus 28. Docking station 10 may require periodic information from battery charger 24 and from battery 26, in order to periodically determine whether battery charger 24 is generating sufficient voltage to charge battery 26, and to periodically determine whether battery 26 is in communication with docking station 10. Docking station 10 may also periodically monitor the charge level in battery 26.

Because of the repetitious nature of these tasks, task manager 22 may distribute each task to be performed based on a predetermined frequency for each task. In certain embodiments, the periodic task may be performed at respective intervals of time. For instance, the presence of battery 26 may be checked once every second, and the charge level of battery 26 may be checked every two seconds. As described in greater detail below, task manager 22 distributes the periodic tasks to leave time during each time interval for performing other processing work, such as real-time computing tasks requested by host computer 12. The real-time computing task may include information requests by a user, communications with docking station 10, or any other suitable task requiring processing by microcontroller 20.

Figure 2:
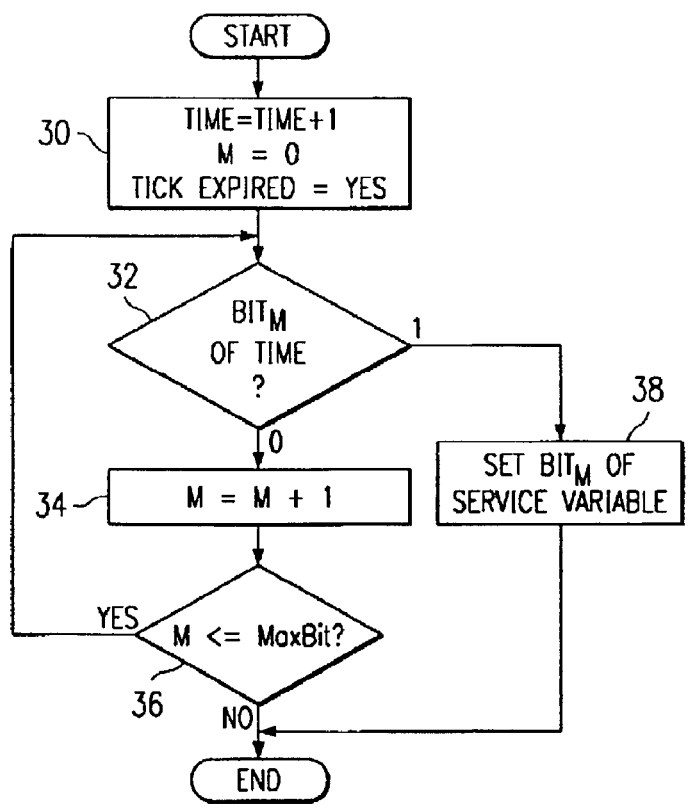
FIG. 2 illustrates a flowchart of an example embodiment of a process for setting execution triggers in a service variable according to the teachings of the present invention.

FIG. 2 illustrates a flowchart of a computer program for a tick interrupt handler within task manager 22. As described in greater detail below, the process may begin in response to a periodic tick interrupt generated automatically by computer hardware according to a predetermined tick interval. When a tick interrupt is generated, the tick interrupt handler may begin by updating various program variables, as indicated at step 30. For example, referring also to FIG. 4, the value of time variable 59 may be incremented by one, as described below in greater detail. Time variable 58 may be used to determine the execution trigger position within the bits of service variable 59, and the value of time variable 58. For instance, time variable 58 may be a five bit number with a value of "00101" that is incremented to "00110". Variable "M" may be used to index a bit position within service variable 59, and at step 30, "M" may be initially set to zero to index the first (i.e., least significant) bit position of service variable 59. The "tick expired" variable may be a Boolean logical variable used to indicate that the tick interval has expired and a new tick interval has begun. At step 30, the value "tick expired" may be set to "YES".

At step 32, the bit at position "M" within time variable 58 may be checked to see if this bit is set. If bit at position "M" is clear, namely zero, variable "M" may be incremented by one, at step 34, to index the next bit position of time variable 58. At step 36, the variable "M" may be compared against "MaxBit" to determine if "M" is less than or equal to the maximum number of bits within service variable 59. In the example embodiment, "MaxBit" may be equal to five, for the five bits within variable time variable 58. If "M" is less than or equal to "MaxBit", the process may pass from block 36 to block 32 to check whether the next bit position of time variable 58 is set. However, if "M" is greater than "MaxBit", the program may end without setting an execution trigger.

Back at step 32, when the bit at position "M" of time variable 58 is set, the process passes to block 38. The program may then set a corresponding bit at position "M" in service variable 59, and the process may end. As described below, the bits in service variable 59 may serve as execution triggers for various periodic processing tasks. In the example embodiment, the tick interrupt handler set execution triggers according to the first bit found to be set in time variable 58.

FIG. 3 illustrates a flowchart of an example embodiment of a computer program within task manager 22 for distributing periodic task workload at various time intervals based on multiples. At step 40, service variable 59 may be cleared through an initialization process to eliminate the possibility of any execution triggers being set. At step 42, a determination for an expired tick may be made. In the example embodiments, task manager 22 may be configured to recognize new ticks at a frequency that is twice the frequency desired for a most frequent periodic processing task. For instance, if the most frequent periodic task is to check every second for whether or not battery 26 is attached, then task manager 22 may be configured to determine that a tick has expired every half second. In alternative embodiments, however, other multiples of the frequency for the most frequent periodic task may be used as the tick interval.

As shown in FIG. 2, the tick interrupt handler may modify service variable 59 and set "tick expired" to "YES", as described above. If a tick has expired, task manager 22 may reset the tick expired variable by setting the value of the logical variable to "NO" at step 44. At step 46, service variable 59 may be interrogated to determine if a bit at position zero (bit zero) is set. If bit zero of service variable 59 is set, bit zero of the service variable 59 may be cleared at step 47 and, at step 48, microprocessor 20 may perform a particular processing task associated with this execution trigger (e.g., processing task "A" in FIG. 4).

However, if it is determined at step 46 that bit zero of the service variable 59 is not set, the next bit position of service variable 59 may be interrogated at step 49. If bit one of service variable 59 is set, microprocessor 20 may clear bit one and perform the task associated with this execution trigger at steps 50 and 51, respectively. The processing task associated with bit one of the service variable 59 may be the next most frequent processing task, such as task "B" in FIG. 4.

As indicated at blocks 52–54 and the proceeding ellipses, task manager 22 may continue to interrogate service variable 59 to check each bit position of service variable 59 for being set. Eventually at step 52, service variable 59 may be interrogated to determine if the final bit position, namely bit "M", is set. In certain embodiments, bit "M" may represent the most significant bit in service variable 59. If bit "M" of service variable 59 is set, the bit at position "M" may be cleared at step 53. At step 54, microcontroller 20 may perform the least frequent processing task. In some embodiments, one or more bits in service variable 59 may not be associated with any processing tasks.

After interrogating service variable 59 for execution triggers being set, task manager 22 may determine if other processing work exists at step 55. Similarly, at step 42, if the tick was determined to not be expired, task manager 22 may also proceed to determine if other processing work exists at step 55. Other processing work may include real-time processing tasks that are not required on a periodic interval. If other processing work exists, microcontroller 20 may perform the other work at step 56.

If there is no other processing work or the other processing work is completed, a determination as to exiting the periodic task may occur at step 57. Typically, exiting the program may occur when the information handling system or the component associated with microcontroller 20 is shut off. For example, if docking station 10 is being shut off, task manger 22 may stop distributing the periodic tasks and exit the program. Generally, however, task manager 22 would not exit but would return to step 42 to determine if a new tick has expired. If time still remains in the tick interval, the tick would not be expired, and task manager 22 may proceed to check if other processing work exists at step 55. However, if the time within the tick interval has ended and the tick interrupt handler has set a new trigger associated with a new tick interval, as depicted in FIG. 2, task manager 22 may interrogate service variable 59 to determine a processing task to perform, as shown in steps 44 through 54.

FIG. 4 illustrates a chart of an example embodiment of service variable 59 with various values associated with respective processing tasks. In correlation with the current value of time variable 58, service variable 59 may be associated with a processing task. As time variable 58 increments by tick interval 61, execution trigger 62 may change to a new bit position within service variable 59.

In some embodiments, service variable 59 may include five bit positions for execution triggers 62. Each execution trigger 62 may be associated with a different processing task or set of processing tasks. Having five execution trigger positions may limit service variable 59 to five different tasks and require "MaxBit" to be set to a value of five. In certain embodiments, the bit in the first position of service variable 59 may represent most frequent processing task 60, shown as "A". The bit in the second position of service variable 59 may represent second most frequent processing task 63, shown as "B". Bits in the third, fourth, and fifth positions of service variable 59 may represent third most frequent processing task 64 (shown as "C"), fourth most frequent processing task 66 (shown as "D"), and fifth most frequent processing task 68 (shown as "E"), respectively.

Time variable 58 may increment each tick interval 61. The frequency of tick interval 61 may be a multiple of the frequency of the most frequent processing task. For example, if the most frequent processing task is to be performed once per second, tick interval 61 may have a frequency of expiring twice per second. In some embodiments, the frequency for the most frequent task may be a multiple of two times the frequency of tick interval 61. In other embodiments, other multiples may be used, including non-integer multiples.

By associating one execution trigger 62 with one processing task, task manager 22 may distribute one processing task for each tick interval 61. Since each tick interval may also allocate time to perform real-time processing tasks, microcontroller 20 may avoid delays in performing real-time processing tasks. In some embodiments, each periodic processing task may be performed at a different interval. While each processing task may be associated with one execution trigger, each execution trigger 62 may not be associated with a processing task. For example, second most frequent processing task 63 may be associated with the bit in the third position of service variable 59 and the bit in the second position of service variable 59 may not be associated with any processing task. In this example, the processing task performed during this interval of time may be the other processing work and not a periodic processing task.

Figure 5:
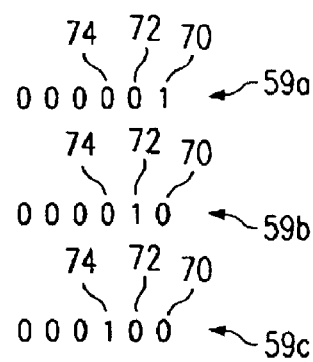
FIG. 5 illustrates various values of the execution trigger of FIG. 4 in greater detail.

FIG. 5 illustrates example embodiments of execution triggers 70, 72, and 74 in service variable 59. In the illustrated embodiment, service variable 59 may include six bit positions associated with six execution triggers, including first execution trigger 70, second execution trigger 72, and third execution trigger 74. Following the setting of service variable 59 in a tick interrupt handler or any other suitable handler for assigning execution triggers, if first execution trigger 70 is set as indicated at service variable value 59a, microcontroller 20 may process most frequent processing task 60. If second execution trigger 72 is set as indicated at service variable value 59b, microcontroller 20 may process second most frequent processing task 63. Further, if third execution trigger 74 is set, as indicated at service variable value 59c, third most frequent processing task 64 may be executed.

Although the present invention has been described with respect to a specific embodiment, various changes and modifications will be readily apparent to one skilled in the art. The present invention is not limited to the illustrated embodiment, but encompasses such changes and modifications that fall within the scope of the appended claims.

What is claimed is:

1. A method of distributing processing tasks using a tick interval in an information handling system, the method comprising:
   at a first multiple of a predetermined tick interval, setting a first execution trigger in a service variable;
   at a second multiple of the predetermined tick interval, setting a second execution trigger in the service variable, wherein the second multiple is greater than the first multiple and the second multiple is staggered from the first multiple, such that the first execution trigger and the second execution trigger are not both set during the same tick interval;
   interrogating the service variable at the predetermined tick interval;
   in response to detecting that the first execution trigger has been set, executing a first processing task associated with the first execution trigger; and
   in response to detecting that the second execution trigger has been set, executing a second processing task associated with the second execution trigger.

2. The method of claim 1, wherein:
   the first processing task comprises a most frequently scheduled task; and
   the predetermined tick interval occurs at least twice as frequently as the most frequently scheduled processing task, such that the most frequently scheduled processing task is performed no more often than at every other tick interval.

3. The method of claim 2, wherein:
   the second processing task comprises a less frequently scheduled task; and
   the second processing task is performing during some but not all tick intervals during which the first processing task is not performed.

4. The method of claim 2, further comprising:
   at a third multiple of the predetermined tick interval, setting a third execution trigger in the service variable; and
   in response to detecting that the third execution trigger has been set, clearing the third execution trigger and executing a third processing task associated with the third execution trigger, such that the third processing task is performing during some but not all tick intervals during which the first processing task and the second processing task are not performed.

5. The method of claim 4, wherein the third processing task comprises a computing task including other computer work.

6. The method of claim 1, wherein:
   setting the first execution trigger in the service variable comprises setting a bit in the service variable;
   setting the second execution trigger in the service variable comprises setting a more significant bit in the service variable; and
   interrogating the service variable at the predetermined tick interval comprises examining a least significant bit set in the service variable.

7. The method of claim 1, further comprising:
   configuring the information handling system to stagger the second multiple of the predetermined tick interval from the first multiple, such that the first execution trigger and the second execution trigger are not both set during the same tick interval; and
   configuring the information handling system to associate the first and second processing tasks with the first and second execution triggers, respectively.

8. The method of claim 1, further comprising:
   clearing the first execution trigger in response to detecting that the first execution trigger has been set; and
   clearing the second execution trigger in response to detecting that the second execution trigger has been set.

9. The method of claim 1, further comprising performing a computing task during the predetermined tick interval following the completion of the processing task associated with the predetermined tick interval, the computing task including other computer work.

10. An information handling system, comprising:
    a microcontroller operable to recognize a predetermined tick interval, to maintain a service variable having at least two execution triggers associated therewith, to associate computing tasks with the at least two execution triggers, and to execute the computing tasks; and
    a task manager associated with the microcontroller, wherein the task manager performs operations comprising:
    at a first multiple of the predetermined tick interval, setting a first execution trigger in the service variable;
    at a second multiple of the predetermined tick interval, setting a second execution trigger in the service variable, wherein the second multiple is greater than the first multiple and the second multiple is staggered from the first multiple, such that the first execution trigger and the second execution trigger are not both set during the same tick interval;
    interrogating the service variable at the predetermined tick interval;
    in response to detecting that the first execution trigger has been set, executing a first computing task associated with the first execution trigger; and
    in response to detecting that the second execution trigger has been set, executing a second computing task associated with the second execution trigger.

11. The information handling system of claim 10, wherein first execution trigger in the service variable comprises a least significant bit.

12. The information handling system of claim 10, wherein the service variable comprises a counter variable incremented by the predetermined tick interval.

13. The information handling system of claim 10, wherein;
  the first execution trigger comprises a first bit in the service variable;
  the second execution trigger comprises a second bit in the service variable; and
  the first and second bits have different bit positions in the service variable.

14. A method of distributing computer tasks using a tick interval in a computer system, the method comprising:
  generating a tick interval for the computer system, the tick interval occurring at least twice as frequently as a most frequently occurring processing task among a predetermined set of processing tasks;
  performing not more than one processing task from the predetermined set of processing tasks at each tick interval; and
  performing the most frequently occurring processing task at every other tick interval.

15. The method of claim 14, further comprising performing a second frequently occurring processing task once every fourth tick interval.

16. The method of claim 14, further comprising performing a third frequently occurring processing task once every eighth tick interval.

17. The method of claim 14, further comprising determining which processing task to perform by interrogating a service variable to find a bit position of a least significant bit set in the service variable.

18. The method of claim 14, further comprising performing other computer work for an information handling system during time remaining in the tick interval following completion of one of the processing task.

19. The method of claim 18, wherein the other computer work comprises a real-time processing task.

20. The method of claim 14, further comprising:
  performing the most frequently occurring processing task at a first multiple of the tick interval; and
  performing a less frequently occurring processing task among the predetermined set of processing tasks at a second multiple of the tick interval.

* * * * *